United States Patent Office 3,089,966
Patented May 14, 1963

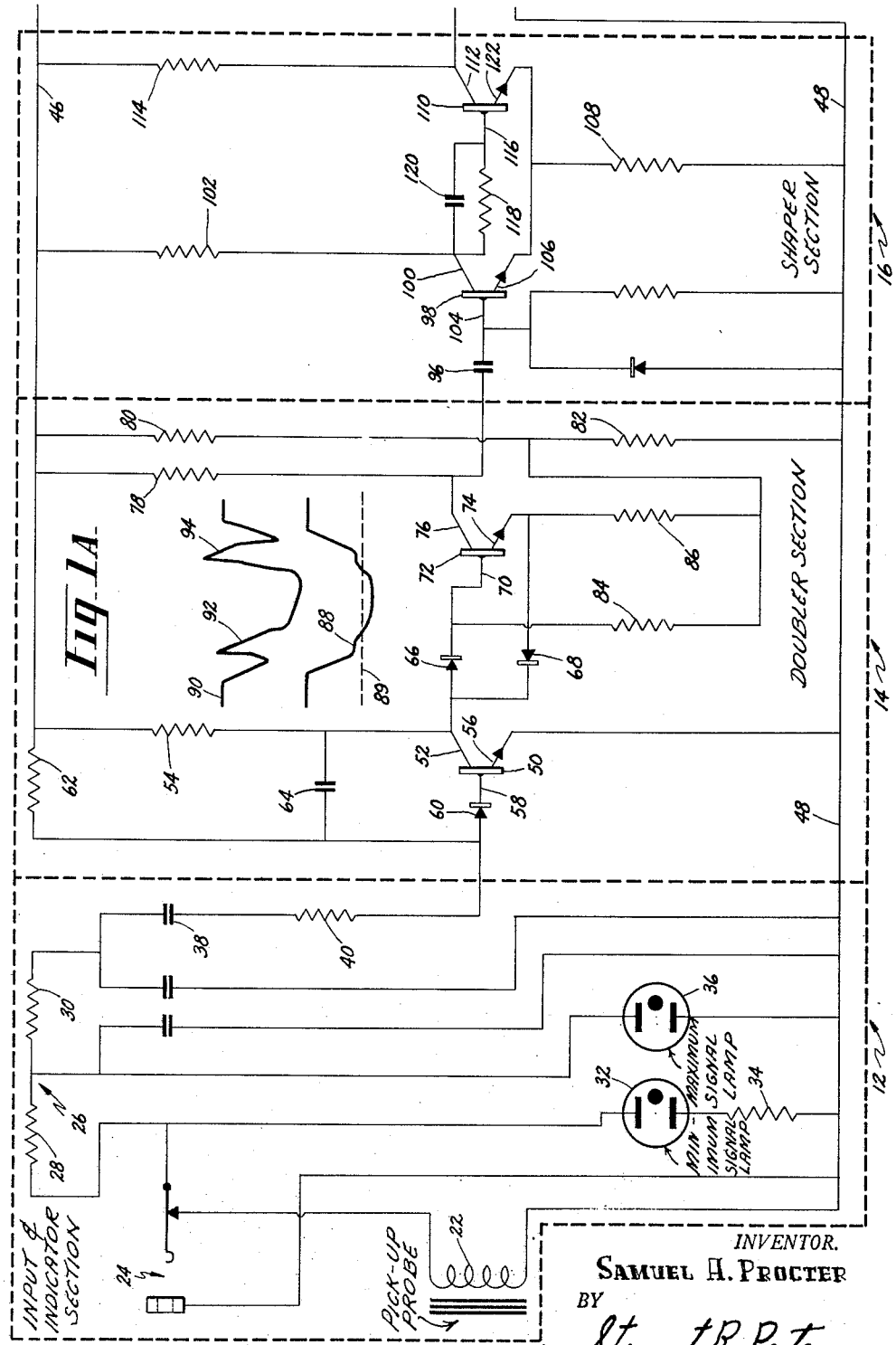

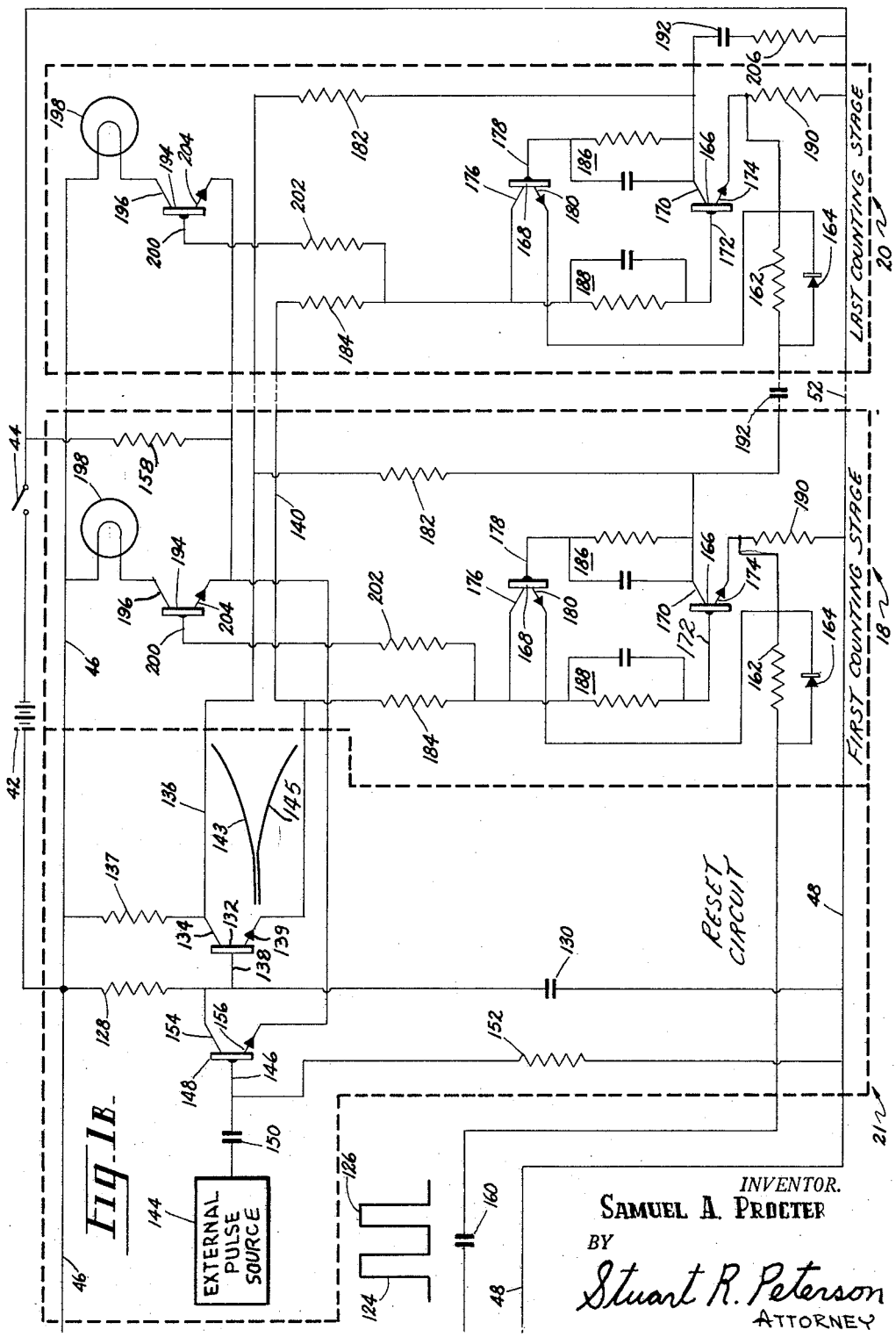

3,089,966
INTERVAL TIMER USING MAGNETIC PICKUP PROBE AND BINARY COUNTER WITH RESET CIRCUIT
Samuel A. Procter, Minneapolis, Minn., assignor to Elmer J. Hankes, Minneapolis, Minn.
Filed May 12, 1960, Ser. No. 28,705
5 Claims. (Cl. 307—88.5)

This invention relates generally to electronic switching circuits and pertains more particularly to a binary counter utilizing transistors.

Bistable counting circuits have become quite common including those in which semiconductor devices are used. However, one important object of the instant invention is to provide a simple and highly reliable biasing arrangement for the various transistors comprising the different counting stages. More specifically, it is an aim of the invention to supply the bias potentials in such a way that a counter constructed in accordance with the teachings of the invention can quickly and easily be reset to its zero state. It is also an object to achieve the foregoing aim with but a few component parts, which in conjunction with a minimum of components in the various binary states themselves, provide a relatively inexpensive counting circuit that may be utilized for a variety of purposes.

A further object is to provide an electronic counter of the envisaged character that is of lightweight construction, thereby encouraging its use as a portable instrument wherever needed.

Still another object of the invention is to provide a binary counter that is quite sensitive to small pulse signals that are to be counted and which may be triggered from stage to stage with but little power.

Other objects will be in part obvious and in part pointed out more in detail hereinafter.

The drawing formed of FIGURES 1A and 1B constitutes only a single figure when placed end to end which is a schematic representation of a pulse counting circuit exemplifying my invention.

Briefly, the invention envisages the picking up of signals with an electromagnetic probe, processing such signals so as to produce two square or rectangular pulses for each complete cycle contained in the original signal, and delivering the squared signals to a transistorized binary counter. A reset circuit is associated with the counter which includes two reset lines with a time delay feature incorporated therein to assure that a given transistor at each counting stage will always become conductive first when initially starting or resetting the counter.

Referring now in detail to the drawing, the circuitry there depicted comprises an input and indicator section 12, a doubler section 14, a shaper section 16, and two binary counting stages 18 and 20, although in actual practice a series of successive stages would normally be employed, and a reset circuit denoted generally by the reference numeral 21.

The signal source may be of various types, and inasmuch as it is not actually a part of my invention, it has not been depicted. For instance it might constitute a simple sine wave generator or a free running multivibrator, the frequency of which is to be determined by counting the number of cycles, half cycles or pulses being generated in a given interval of time. Also, the source might be an automatic A.-C. spot welder, the conventional timer of which is to be checked by counting the actual cycles (more specifically the half cycles) during which the machine operates to effect a given weld. For the sake of discussion, it will be assumed that the source is an A.-C. welding machine and that there is accordingly an accompanying alternating electromagnetic field produced by the sine wave welding current. Since the details of the source, whether a welding machine or other electrical equipment, are unimportant to an understanding and practicing of the instant invention, further description thereof is believed unnecessary other than to say that the source is inductively coupled to the input and indicator section 12 via a pick-up coil 22 that is positionable with respect to the electromagnetic field. However, the pick-up coil 22 may be by-passed by means of a closed circuit jack 24. The jack 24 permits various other signal sources to be plugged into the section 12.

The input and indicator section 12 includes in circuit with the jack 24 a voltage divider 26 composed of resistors 28, 30. In shunt with the coil 22 and jack 24 is a neon glow tube 32 and a current limiting resistor 34. The tube 32 is intended to glow when the coil 22 has been positioned sufficiently within the magnetic field so as to produce a signal strength above a minimum threshold level. A second neon glow tube 36 is connected between the voltage divider at the juncture of its resistors 28, 30 and the side of the coil 22 to which the resistor 34 is connected. This tube 36 will normally remain unlit, but will light if the signal strength is greater than the proper amount. Thus, when the neon tube 36 glows, the user will withdraw the pick-up coil 22 farther away from the magnetic field until it goes out, thereby indicating that a signal voltage in the proper operating range is being developed. The resistor 30 of the voltage divider 26 is connected to the doubler section 14 via a capacitor 38 and resistor 40. More will be said hereinafter concerning the particular connection of the resistor 40 to the doubler section 14.

At this time, though, attention is directed to the employment of a D.-C. source of potential in the form of a battery 42. The battery circuit includes a switch 44, whereby D.-C. potential can be applied between a positive potential line or bus 46 and a negative potential line or bus 48, this last bus serving as a common ground. Various transistors are energized from the battery 42, as will presently be seen.

The first transistor to be referred to has been denoted by the numeral 50, it being shown as part of the doubler section 14. As illustrated, this transistor 50 is a N-P-N transistor, and may be typically a 2N213 one, as may others hereinafter mentioned. Its collector 52 is connected to the bus 46 through a resistor 54, whereas its emitter 56 is attached directly to the bus 48. The base 58 of the transistor 50 is connected to the previously referred to resistor 40 by way of a diode 60, the purpose of which is to prevent the base 58 from going so far negative that the transistor 50 will be damaged. The juncture of the resistor 40 with the diode 60 is also connected to the bus 46 through a resistor 62. However, an inverse feedback from the collector 52 to the base 58 is provided by a capacitor 64. The transistor 50 is normally conductive but will be rendered nonconductive whenever the charge on the capacitor 38 drives the base 58 sufficiently negative to cut off the transistor 50, the capacitor 38 being alternately charged negatively and positively inasmuch as we are here concerned with an A.-C. signal picked up by the coil 22.

While the transistor, when permitted to conduct, produces a collector signal that first increases in a negative direction and then decreases positively to zero, the actual doubling action is derived from the employment of two diodes 66, 68. The diode 66 is connected in a forward direction between the collector 52 of the transistor 50 and the base 70 of a transistor 72. The diode 68, on the other hand, is connected in a reverse direction between the collector 52 and the emitter 74 of the transistor 72. The collector 76 of the transistor 72 is connected to the positive bus 46 through a resistor 78. To establish proper intermediate potentials for the base 70 and emitter 74, a voltage divider composed of resistors 80, 82 is employed. The base 70 is connected to the juncture of the resistors 80, 82, via a resistor 84, whereas the emitter 74 is connected to this same juncture through a resistor 86.

Before continuing, the waveforms within the doubler section 14 should be examined. Accordingly, the output voltage at the collector 52 of the transistor 50 has the shape denoted by the reference numeral 88. The output voltage from the collector 76 of the transistor 72 has been assigned the reference numeral 90. With respect to the waveform 90, though, it will be discerned that there are two positive excursions or pulses contained therein, these pulses having been given the reference numerals 92, 94.

Describing now the manner in which these waveforms are derived, it can be first poined out that the waveform 88 is produced when the negative charge on the capacitor 38 decreases enough to restore the transistor 50 to its conductive state, although influenced somewhat by the feedback supplied by the capacitor 64. The capacitor 64, it might be mentioned, is responsible for forming the slopes on the sides of the voltage waveform 88. As the collector voltage goes sufficiently negative, as shown on the waveform 88, the diode 68 is instrumental in pulling the voltage of the emitter 74 down to such an extent that the pulse 92 in the waveform 90 results. When the collector voltage starts returning toward zero, that is, going sufficiently positive, current flows into the base 70 to produce the second pulse 94. Stated somewhat more specifically, it is to be noted that the two extremes of the waveform 88 go above and below an arbitrarily selected bias voltage labeled 89 obtained from the voltage divider 80, 82. Therefore, when the base 70 is sufficiently positive, that is, when the voltage applied to base 70 is above the level 89, the transistor 72 conducts. Additionally, when the emitter 74 is sufficiently negative, that is, when the emitter voltage is below the line 89, the transistor 72 conducts. The conduction of transistor 72, therefore, occurs twice for each negative cycle which is twice for each full cycle and hence once for each half cycle.

Referring now to the shaper section 16, it will be seen that the output voltage pulses 92, 94 are transmitted thereto via a coupling capacitor 96. The shaper 16 may be a conventional Schmitt trigger circuit and the shaper in this instance is very similar to the Schmitt trigger type of circuit, both as to its circuitry and output. The illustrated shaper is an "overdriven" two stage amplifier. The first stage involves the use of a transistor 98 having its collector 100 connected to the positive line or bus 46 through a resistor 102, its base 104 connected to the coupling capacitor 96, and its emitter 106 connected to the bus 48 through a resistor 108. The second stage of the amplifier includes a transistor 110, this transistor having its collector 112 connected to the bus 46 through a resistor 114, its base 116 connected to the collector 100 via a parallel resistor 118 and capacitor 120 circuit, and its emitter 122 connected to the same bus 48 through the same emitter resistor 108 as is the emitter 106.

Whether the shaper section 16 appears as shown or is modified to provide a Schmitt trigger arrangement, the desired goal is that the output from the collector 112 be in the form of rectangular pulses, one for each of the waveforms 92, 94. These pulse signals have been denoted by the reference numerals 124, 126.

Before describing in detail the binary stages 18, 20, it is convenient to consider the components comprising the reset circuit 21. The reset circuit 21 includes a dropping resistor 128 and a capacitor 130 connected in series between the two buses 46, 48. A N-P-N transistor 132, also of the 2N213 type, has its collector 134 connected to a first reset line 136 which is in turn connected to the positive bus 46 through a resistor 137, its base 138 connected to the juncture of the resistor 128 and the capacitor 130, and its emitter 139 connected to a second reset line 140. It may be explained at this time that the reset line 136 is initially at the potential of the positive bus 46 and the reset line 140 with which the line 136 is paired is at the potential of the ground or negative bus 48. As will hereinafter be better understood, the potentials of the lines 136, 140 will change as indicated by the curves 143, 145, respectively when the switch 44 is initially closed.

The reset 21 circuit contemplates using a source 144 of reset pulses to accomplish the resetting function which source is coupled to the base 146 of a transistor 148 via a capacitor 150. The base 146 is connected to the bus 48 through a resistor 152. The transistor 148 has its collector 154 connected directly to the base 138, whereas its emitter 156 is connected to the bus 48 through a resistor 158.

Returning now to the output from the shaper section 16, it will be discerned that the shaper is coupled to the first binary stage 18 through the agency of a capacitor 160, one side of the capacitor 160 having direct connection with the collector 112 of the transistor 110. The other side of the capacitor 160 is connected to a resistor 162 which is paralleled by a diode 164.

Describing in detail the first stage 18, which incidentally is practically identical with the stage 20 other than that the stage 20, being the last stage of any preferred number of such stages, feeds into a load impedance, it will be observed that there is a pair of transistors 166 and 168, such as of the 2N213 type also. The transistor 166 has its collector, base, and emitter electrodes denoted by the numerals 170, 172 and 174, respectively, whereas the transistor 168 has its collector, base, and emitter electrodes designated by the numerals 176, 178 and 180, respectively. It should be expressly noted that the collector 170 is connected to the reset line 136 through a resistor 182, and that the collector 176 is connected to the other reset line 140 through a resistor 184. Connecting the collector 170 to the base 178 is a parallel resistor and capacitor network 186, and in similar fashion connecting the collector 176 to the base 172 is a parallel resistor and capacitor network 188. The emitters 174, 180 are connected to the bus 48 through a resistor 190. The first stage 18 is coupled to the succeeding stage 20 through a capacitor 192.

Further included in the stage 18 is another transistor 194. This transistor 194 has a collector 196 connected to the bus 46 through an indicating lamp 198, such as a small low voltage incandescent lamp. The transistor 194 has its base 200 attached to the collector 176 via a resistor 202. The emitter 204 of the transistor 194 in this situation leads to the bus 48 through the resistor 158.

As hereinbefore indicated, the stage 20 is a substantial duplicate of stage 18. Consequently, identical reference numerals have been used to denote identical elements. In order to keep the drawing as simple as possible, though, stage 20 has been regarded as being the last stage. Accordingly, a load resistor 206 has been shown as being in circuit with the capacitor 192 of this stage 20 and the bus 48.

Having in mind the components that have been described and their organization with respect to each other, it is believed that a complete understanding of the invention may now be had from a somewhat more detailed description of its operation. In this regard it has been assumed for illustrative purposes that the unpictured source is a sine wave generator and that it is desired to provide a count representative of the number of cycles generated during a selected period of time, more specifically, a total count indicative of the number of half cycles, as will be made more apparent.

It has been assumed further that the signal source is a resistance welding machine. When sufficient inductive coupling exists between the pick-up coil 22, which is normally held in one's hand, the neon glow tube 32 will light. However, it will be recalled that the coil 22 should not be positioned so close as to cause the neon tube 36 to light.

Closure of the switch 44 will apply a positive bias to the base 58 of the transistor 50 via the bus 46 and will cause initial or normal conduction of the transistor 50. While both positive and negative swings of the voltage signal picked up by the coil 22 will be passed by the voltage divider 26 to the diode 60, only the negative signals will be instrumental in driving the normally conductive transistor 50 into a nonconductive state. Actually, until the switch 44 is closed, none of the transistors 50, 72, 98, 110, 132, 166, 168 and 194 will be in a conductive state. However, with the switch 44 closed, the transistors 72, 98 and 110 are immediately conditioned for operation by reason of the potential applied to the collectors and emitters of these particular transistors. In other words the doubler and shaper sections 14, 16 are in readiness. Concurrently with the closing of the switch 44 a positive potential is also impressed upon the collectors 170 of the transistors 166 belonging to both binary stages 18, 20. It will be understood that up to this time these transistors have not been conducting, for no biasing potentials have been applied thereto. Even though a positive potential is applied to the collectors 170, the transistors 166 of each stage still are not made conductive because no potential as yet has been impressed upon the bases 172 of these transistors. This is so by virtue of the fact that at the moment the line 140 still has not been energized owing to the present nonconducting state of the transistor 132. Such a nonconductive state prevails for a short interval due to the voltage drop occurring across the capacitor 130 while it is becoming charged. Stated somewhat differently, the capacitor 130, say of the order of 4 μf., introduces a time delay of several milliseconds before the base 138 is brought to a bias potential sufficient to cause forward conduction of the transistor 132. The bus 140, of course, cannot become energized prior to the transistor 132 being turned on.

When the line 140 becomes energized, though, a positive potential is then immediately applied to the collectors 176 of the transistors 168, and with the bias supplied from the line 136 via the resistor and capacitor networks 186, the transistor 168 of each stage 18, 20 becomes conductive.

Due to the voltage drop across the collector resistor 184 in each instance, the transistor 194 of each stage 18, 20 is not driven into its conductive stage and both indicating lamps 198 remain "off."

When the base 58 of the transistor 50 swings sufficiently negative this normally conducting transistor assumes a quiescent state. On the other hand, when conducting, the voltage at the collector 52 of this transistor will be pulled more negative as indicated by the waveform 88, the waveform being influenced by the capacitor 64. This in turn causes the voltage waveform 90 to be produced containing the previously described positive pulses 92, 94. The pulses 92, 94 are formed only when the transistor 50 is allowed to conduct, which is when the source is producing a positive half cycle, for when the base 58 is sufficiently negative the transistor 50 does not conduct. Under such a set of circumstances the counting circuit comprised of the stages 18 and 20 will register two counts for each positive half cycle. Thus, the overall count will be indicative of the total number of half cycles.

When a pulse 92 or 94 arrives from the doubler section 14, however, it is amplified by the shaper section 16 in a conventional manner, and the now squared amplified pulse output, which is a positive going one, is delivered to the first stage 18. The emitter 180 of the transistor 168 is momentarily raised above its steady state potential with the consequence that the current flowing through the resistor 184 is lessened. Such a change is automatically accompanied by a rise in potential at the collector 176 which is reflected in a corresponding rise in the biasing potential of the base 172 of the transistor 166. The change in bias is sufficient to drive the transistor 166 into its "on" or conductive state.

Upon such a happening, there is a flow of current through the collector resistor 182 with an attendant voltage drop thereacross. Since the resistor 182 is connected to the base 178 of the transistor 168 through the resistor and capacitor combination 186, the bias of this base is made sufficiently less positive so as to cut off transistor 168.

Cutting off of the transistor 168 causes an immediate rise in the potential of its collector 176. Since the base resistor 202 is connected to the juncture of the collector 176 and the resistor 184, it follows that the bias impressed on the base 200 of the transistor 194 is increased enough in a positive direction to cause this transistor to be turned on, thereby lighting the lamp 198 of stage 18 and thus signifying the registering of the first pulse count, which is indicative under the assumed circumstances of a half cycle.

No count is transferred as yet to the stage 20 because when the transistor 166 is changed from its quiescent state to its conductive stage, there is a voltage drop produced across the collector resistor 182. This produces a negative going pulse through the coupling capacitor 192 which has no effect on stage 20, for as with stage 18 the stage 20 is designed to be triggered by only positive pulses.

When the second positive pulse arrives from the shaper 16 it raises the potential at the emitter 174 of the transistor 166 to such an extent that this transistor is returned to a nonconductive condition, thereby raising the potential at the collector 170 because only an insignificantly small amount of current will be flowing in the quiescent state of the transistor.

A rise in potential at the collector 170 of the transistor 166 influences in a positive direction the bias applied to the base 178 of transistor 168 via the network path provided by the resistor-capacitor combination labeled 186. Consequently, the transistor 168 is returned to its conductive state, and in returning to this state turns off the transistor 194 and its lamp 198.

Concomitantly with the flipping of the transistor 168 to its conductive state, a positive transfer pulse is forwarded via the coupling capacitor 192 to the emitters 174, 180 of the transistors 166, 168 belonging to the second stage 20. The action taking place in this stage is identical to that described in conjunction with the receipt of the first positive pulse at stage 18. Very briefly, the transistor 168 of stage 18 is switched from a conductive condition to a nonconductive one, the transistor 166 of stage 18 at the same time being driven into saturation and the transistor 194 of this stage in turn becoming conductive to light its lamp 198.

On receipt of the third pulse from the shaper 16 the first stage 18 will again be flipped, causing its lamp 198 to again be lighted. As with the first pulse, no transfer pulse, that is no positive pulse, is passed on to stage 20. However, this will occur on the fourth pulse and at the same time a positive pulse would be forwarded to the succeeding stage which has not been pictured. As herein already indicated, the stage 20 has been considered to be the last stage and therefore its output is merely dissipated in the load resistor 206 in the illustrated instance.

The resettling, in the illustrative case, is effected via the reset pulse source 144, the forwarding therefrom momentarily of a positive pulse driving the base 146 of the transistor 148 sufficiently positive to produce a momentary conduction of the transistor 148. Such conduction, owing to the connection of the collector 154 thereof to the base 138, will cause the base 138 to go sufficiently negative to produce a temporary cutting off of the transistor 132. Such a happening returns the reset line 136 to the potential of the positive bus 46, and the reset line 140 to substantially the potential of the bus 48. In other words, when the transistor 132 is conducting, there is very little difference between the potential of the line 136 and that of the line 140, as evidenced by the asymtotic relation of the lefthand portions of curves 143, 145. The righthand portions of the curves, though, are spaced a considerable distance apart, the maximum spacing at the extreme right end being indicative of the difference in potential of the lines 136, 140 when the transistor 132 is not conducting. It should be understood that just such a condition also prevails at the moment the switch 44 is initially closed, for the capacitor 130 takes a few milliseconds to charge to the extent necessary to cause conduction of the transistor 132. What occurs, then, is that the forwarding of a reset pulse from the source 144 is instrumental in lowering the potential across the capacitor 130 enough to discharge the capacitor to such an extent that the curves 143, 145 result. It has already been explained that when the line 140 becomes energized, a positive potential is applied to the collectors 176 of the transistors 168, and with the bias supplied from the line 136 via the resistor and capacitor networks 186, the transistor 168 of each stage 18, 20 becomes conductive. This is the reset condition of the counting stages 18, 20. Receipt of either a counting pulse 124 or 126 will then initiate another counting step.

In summation, then, no matter what count has been registered, a pulse from the reset pulse source 144, will reset the counter. This will be the situation irrespective of how many counting stages are employed.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A pulse counting circuit comprising a plurality of counting stages each including a pair of transistors interconnected for binary operation when triggered by pulses which are to be counted, and means for supplying biasing potentials to said transistors including first and second lines with one electrode of one transistor of each pair of transistors being connected to said first line and the corresponding electrode of the other transistor of each pair being connected to the second line, said biasing means further including means for delaying the energization of said second line until said first line has been energized, said first line being connectable to one side of a potential supply, said delay means including a resistor and capacitor connected in series between said one side and the other side of said supply, and means responsive to the charging of said capacitor for providing a circuit connection between said lines when said capacitor has had time to reach a predetermined state of charge.

2. A pulse counting circuit in accordance with claim 1 in which said last-mentioned means is a transistor having a base electrode, a collector electrode and an emitter electrode, said base electrode being connected to the juncture of said resistor and capacitor and its other two electrodes connected to said lines.

3. A counting circuit comprising a plurality of counting stages each including a first and second transistor having a collector, base and emitter, a first resistor-capacitor network in each instance interconnecting the collector of the first transistor to the base of the second transistor, a second resistor-capacitor network in each instance interconnecting the collector of the second transistor to the base of the first transistor, impedance means connecting the collectors of said transistors to a common point, a pair of lines, a collector resistor in each instance connecting the collector of said first transistor to one of said lines, a collector resistor in each instance connecting the collector of said second transistor to the other of said lines, a reset transistor having a collector, base and emitter, the collector of said reset transistor being connected to said first line and its emitter being connected to said second line, a resistor and capacitor connected in series, the base of said reset transistor being connected to the juncture of said resistor and capacitor, and switch means for connecting said lines and said resistor-capacitor to a source of direct current potential.

4. A counting circuit in accordance with claim 3 including a reset pulse source connected to said juncture of said resistor and capacitor.

5. In a counting circuit including a plurality of successive counting stages with each stage having a pair of transistors connected for binary operation, a reset circuit for said stages comprising a pair of lines, means for connecting one line to one side of a direct current potential source, said transistors being connected to the other side of said source, a resistor and capacitor connected to the other side of said source, a transistor having a base electrode, a collector electrode and an emitter electrode, one of said electrodes constituting a control electrode which is connected to the juncture of said resistor and capacitor, and the remaining electrodes being respectively connected to said lines, means connecting one line to one transistor of each pair, and means connecting other line to the other transistor of each pair.

References Cited in the file of this patent

UNITED STATES PATENTS

| 2,521,774 | Bliss | Sept. 12, 1950 |
| 2,571,409 | Beyers | Oct. 16, 1951 |

FOREIGN PATENTS

| 833,967 | Great Britain | May 4, 1960 |

OTHER REFERENCES

Rider's Tape Recorder Manual, vol. 1, page 265, 1955.
Electronic Industries, July 1945, pages 97 to 99, 134, 138, 142, and 146.